July 25, 1950  J. W. PLAUKA ET AL  2,516,254
METHOD OF EMBOSSING STRUCTURAL PANELS
Filed June 6, 1947
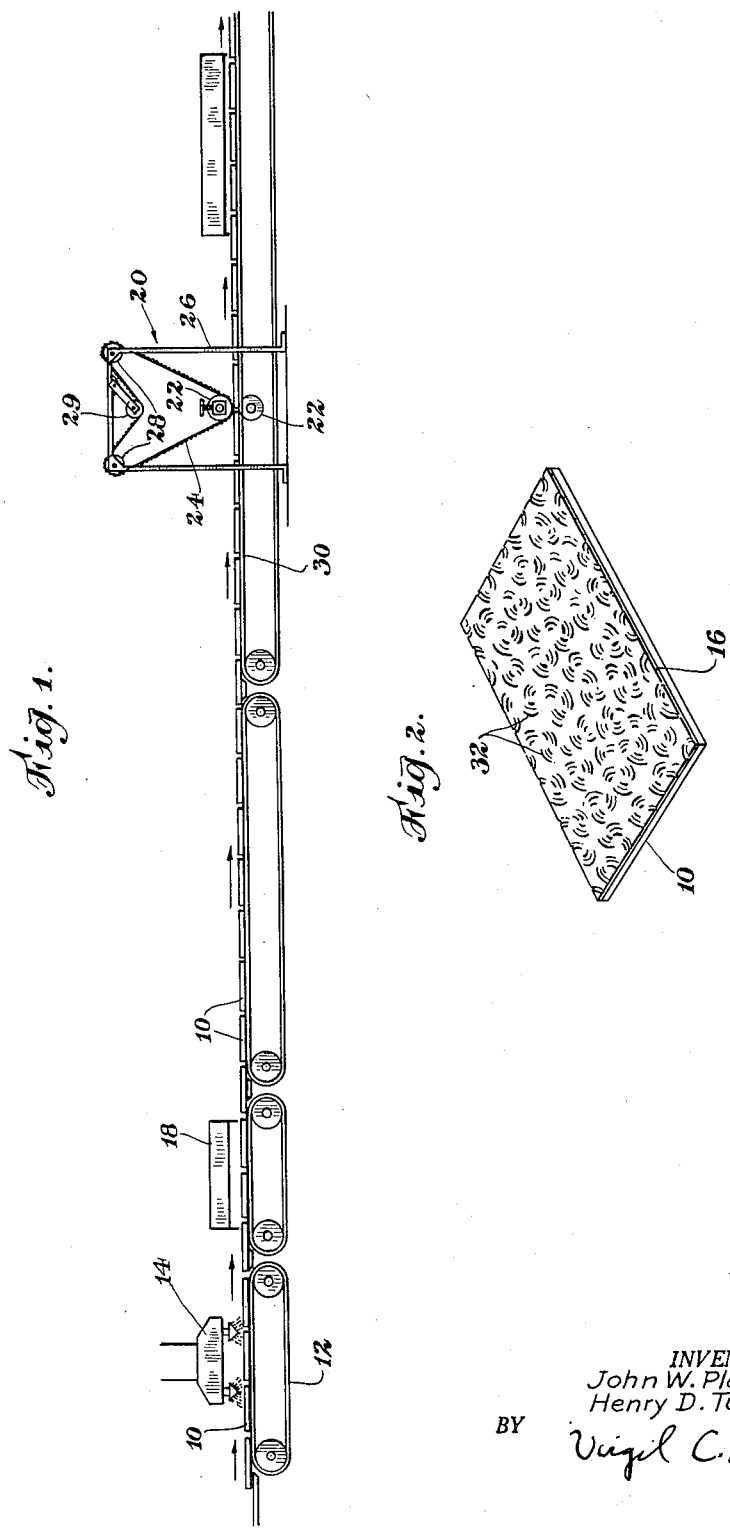
INVENTORS.
John W. Plauka.
Henry D. Tucker.
BY Virgil C. Kline Patented July 25, 1950

2,516,254

UNITED STATES PATENT OFFICE 2,516,254

METHOD OF EMBOSSING STRUCTURAL PANELS

John W. Plauka, Plainfield, and Henry D. Tucker, Union, N. J., assignors to Johns-Manville Corporation, New York, N. Y., a corporation of New York Application June 6, 1947, Serial No. 753,000

2 Claims. (Cl. 117—11)

This invention relates to decorative structural panels, and is particularly concerned with strong panels bearing an embossed enamel coating suitable for use as interior wall linings, and to a method of producing such panels.

The decorative panel and method of manufacture which forms the subject of the present invention represents an improvement over the article and method which are described in U. S. Patent 2,303,395 granted December 1, 1942, to Oswald R. Schultz and Henry D. Tucker, for Method of Making Decorated Material. As pointed out in said patent, attempts to use metal embossing plates of copper, aluminum, or ferrous metals for impressing patterns on surfaces of cold moldable acidified phenolic resins have failed for the reason that gas bubbles and blisters are developed at the embossed resin surface. The patent teaches that coatings of cold moldable phenolic and urea-formaldehyde resins can be embossed by using as the embossing medium a cellulosic plastic sheet. However, in practicing said patent process it is necessary to maintain the embossing medium in contact with the resin coating throughout a period of hardening cure of the resin, in order to retain a clear and sharp impression.

An object of the present invention is to provide a low-gloss thermosetting enamel coating having such composition and consistency at its cold molding stage as to accept and retain an embossed pattern impression while permitting immediate stripping of the embossing medium prior to a heat hardening set.

A more general object is to provide a simple and efficient method of producing decorative structural panels.

With the above object in view, the invention consists in the improved decorative structural panel and method of producing same, which are hereinafter described and more particularly defined by the accompanying claims.

In the following description reference will be made to the attached drawings, in which:

Fig. 1 presents a schematic flow sheet of the principal steps and equipment requirements for manufacturing the panels; and Fig. 2 presents a diagrammatic view in perspective of a decorative structural panel such as forms the subject of the present invention.

In accordance with the present invention, decorative coatings are developed on a comparatively rapid and continuous cycle for base structural panels of asbestos-cement, wood fiber board, clay tile, or other suitably strong structural sheet material. A primary step of the process is that of applying to one surface of the base sheet a suitable low-gloss synthetic enamel coating, as by spraying or by roll applicator. The next step is to heat cure the enamel coating to such consistency that it will accept and retain an embossed imprint or design by a cold low pressure embossing operation. The embossing medium is immediately stripped from the enamel surface at the completion of the pressure embossing operation, and the composition and consistency of the coating at this stage must be such as to allow for a heat hardening set without any distortion or deformation of the embossed design.

Suitable coating compositions include low-gloss enamels comprising 60–75% dry weight of finely divided inorganic pigment and filler particles uniformly distributed throughout a rapidly hardenable synthetic resin matrix comprising an amino-formaldehyde-modified drying-oil alkyd resin. Such resins are essentially copolymers of drying-oil modified alkyd resins and alkyd modified urea or melamine resins. Such resins can be loaded with up to 75% by weight of finely divided pigment and filler particles, and the resulting enamels can be applied in solvent reduced state, as by spraying and rapidly cured at temperature of the order of 250° F. to a substantially non-tacky, cold molding stage, in from 3 to 5 minutes heating at a temperature of the order of 250° F. At the stage at which the embossing operation takes place these low-gloss enamels should be sufficiently soft to accept and retain a fingernail impression, and sufficiently stiff and resistant to heat softening as to retain the embossed design during a subsequent baking and hardening treatment.

The following formulas of low-gloss enamel are examples of a large number of formula modifications which can be used to impart ornamental coatings of pastel shades and colors on baseboards of asbestos-cement or felted wood fiber composition:

Formula I

| | Parts by weight |
|---|---|
| Titanium dioxide | 250 |
| Whiting | 100 |
| Clay | 100 |
| Diatomaceous earth | 100 |
| Drying-oil modified alkyd resin (50% solids solution) | 300 |
| Alkyd modified melamine formaldehyde resin (55% solids solution) | 100 |
| Toluol | 50 |

Formula II

| | Parts by weight |
|---|---|
| Titanium dioxide | 287 |
| Whiting | 100 |
| Clay | 100 |
| Diatomaceous earth | 75 |
| Drying-oil modified alkyd resin (60% solids) | 239 |
| Urea-formaldehyde resins (50% solids) | 133 |
| Toluol | 280 |

A preferred alkyd resin is one comprising the condensation product of 40–60% by weight of a drying or semi-drying-oil such as linseed oil, soya oil or dehydrated castor oil, with a glycerolphthallate resin containing from 35 to 45% phthallic anhydride. Included in the total combined resin content of the coating is an amount of amino-formaldehyde resin (urea or melamine) sufficient to constitute at least 10%, and up to about 50% by weight, of the total resin matrix.

Coating enamels of the indicated composition may be applied by spray, and cured to suitable consistency for embossing by 3 to 5 minutes heating at temperatures of the orders of 200–250° F., or alternatively by air drying cure at normal temperature for 15 to 30 minutes. After such partial cure, the resin coating is in condition to accept a low pressure embossing design and to retain such design, after immediate stripping of the embossing medium from the coated panel, while a final heat hardening set is imparted to the coating, without any sluffing or leveling out of the design imprint.

In the coating compositions set forth above, the primary white pigments, such as titanium dioxide or zinc sulfide the extenders, such as whiting and clay, and the flatting agents such as diatomaceous earth, should all be sufficiently finely divided to pass standard 200 mesh screens. The white base enamels which are suggested by the formulas may be tinted any desired color by incorporation of the commonly used color pigments, such as iron oxides, chrome yellows, chrome greens, and iron or phthalocyanine blues.

An important contributing factor in the successful practice of the embossing operation is the type of embossing medium employed. While cellulose ester sheets can be used as the embossing medium, the preferred medium is a fabric reinforced polymerized vinyl ester sheet, and preferably a vinyl copolymer sheet comprising about 90% vinyl chloride and 10% vinyl acetate. Polymerized vinyl ester sheets are much more resilient than cellulose ester sheets, and are tougher and more resistant to wear deformation. Vinyl ester polymer sheets may be made sufficiently hard to emboss clear designs and patterns, while retaining sufficient resilience so that under the required embossing pressure the elastic protuberances are slightly deformed, but undergo immediate retraction and loosening from the impression receiving surface upon release of embossing pressure. The vinyl ester polymer sheets have exceedingly tough and smooth surfaces and they exhibit no substantial tendency or affinity for adherence to the coating at the termination of the pressure embossing treatment.

Alkyd resins, and also urea-formaldehyde or melamine-formaldehyde resins, can be heat hardened to infusible colorless coatings. However, urea-formaldehyde and melamine-formaldehyde resins in heat hardened condition are hard and brittle. On the other hand, alkyd resins when heat hardened are tough and resilient and their coatings adhere tenaciously to base sheets of asbestos-cement or wood fiberboard. The copolymer urea or melamine-formaldehyde-modified-drying-oil alkyd resins which form the enamel matrix, produce tough, resilient wear and moisture resistant surfaces, and have the property of hardening rapidly into strongly adherent coatings which are light fast and insoluble in organic solvents.

A process flow sheet for producing an ornamented structural panel is portrayed schematically in Fig. 1. A baseboard 10 of wood fiber composition, or hardened and cured asbestos-cement composition, is thoroughly dried to eliminate any moisture which might subsequently cause blistering of the baked finish. The surface of the board which is to receive the enamel coating should be fairly smooth and level, though it need not be finely sanded or glazed. A primer-sealer coat may be applied by spray coating the board and force drying in a drier. A suitable primer may comprise a clear or pigmented vinyl resin coating.

The baseboards, with or without the primer-sealer coat, are loaded on a continuous conveyer 12 and passed through a spray booth 14 where a heavy coat 16 of the low-gloss synthetic enamel is applied to the top surface of the board by spraying. The applied coating should be heavy enough to develop a finish coat of about 1–3 mils thickness. The enamel coating is pre-cured to a cold molding stage by force drying in an oven 18, or under infra red lights, at a temperature of about 250° F. for a period of 3 to 5 minutes. This heating period has been found sufficient to drive off all but a minor portion of the solvent and to impart to the coating the correct degree of low tackiness and moldability at normal temperature for receiving and retaining an embossing design. After a short cooling period the thus coated panels are conveyed through the embossing machine 20.

A suitable embossing machine consists of two rubber covered press rolls 22 between which runs an endless vinyl copolymer resin embossing belt 24. This belt is preferably reinforced with fabric. The clearance between the rolls 22 is adjusted in accordance with the thickness of the board 10 and the amount of embossing pressure required. A framework 26 overlies the upper press roll and supports a system of small steel rolls 28 which carry the belt 24. A weighted idler roll 29 keeps the belt taut at all times.

The thus pre-cured enamel coated board is carried by a conveyor 30 between the press rolls and in pressure contact beneath the embossing belt. A design 32 is imprinted on the top surface of the enamel coating as the board passes through the bite between the press rolls. The embossing belt immediately separates from the surface of the coating as the board leaves the bite of the press rolls. To avoid any difficulty in separating the embossing belt from the enamel surface, the embossing belt may be lightly dusted with zinc stearate powder. The thus coated and embossed panels are finally baked in a tunnel drier for a period of 15 minutes to half an hour at a temperature of 250–350° F. The finished product is then cooled and is ready for packaging and shipping.

In the embossing operation it is desirable to use designs with fairly deep impressions which give better reproductions in the enamel coating than shallow designs. Since the elevations on the embossing belt develop depressions in the coating, the embossing medium is made with a negative of the final desired pattern on its embossing surface. The best designs are produced when a fairly large sized pattern is superimposed on a grained texture and produced at regular intervals over the coated panel surface.

The embossing operation may be carried out in a modified form of the preferred machine illustrated. The top roll of the press roll unit may comprise a large cylinder having a diameter of 26 inches or more, with its peripheral surface covered with rubber or equivalent resilient cushioning material. A short embossing belt is then wrapped around the rubber coated surface of the cylinder and firmly secured thereto.

The enamel coating may be made in one pastel color and the design may be reproduced with another color, by doctor blading a second colored coating on the face of the embossing belt in such a way as to fill the depressed areas of the embossing design. On press rolling the embossing belt in contact with the surface of the panel coating, the second color is deposited on and superimposed upon the design against the background of the lightly colored coating. The resulting colored design is much more distinct and easily visible, as compared to a simple embossed design impressed on a one color background.

The invention which has been thus described by detailed example is not limited as to such details and it is to be understood that variations, changes and modifications are contemplated within the scope of the invention as defined by the following claims.

What we claim is:

1. A method of making decorative structural panels which comprises, coating one surface of a fibrous baseboard with a solvent reduced enamel containing a major dry weight proportion of inorganic pigment and filler particles distributed uniformly throughout a binder resin matrix of a partially reacted copolymer of amino-aldehyde resin and drying-oil modified alkyd resin, precuring the resin coating to a substantially nontacky semi-solid stage with removal of a major portion of the solvent, embossing a pattern on the exposed face of the partially cured coating by pressure contact with a resilient flexible embossing medium of vinyl copolymer resin, immediately separating the embossing medium from the thus embossed coated surface, and heat hardening the embossed coating to an infusible, insoluble stage.

2. A method of making decorative structural panels which comprises, coating one surface of a fibrous baseboard with a solvent reduced enamel containing a major dry weight proportion of inorganic pigment and filler particles distributed uniformly throughout a binder resin matrix of a partially reacted copolymer of amino-aldehyde resin and drying-oil modified alkyd resin, precuring the resin coating to a substantially nontacky semi-solid stage with removal of a major portion of the solvent, embossing a pattern on the exposed face of the partially cured coating by pressure contact with a resilient flexible embossing medium of polyvinyl ester resin, immediately separating the embossing medium from the thus embossed coated surface, and heat hardening the embossed coating to an infusible, insoluble stage.

JOHN W. PLAUKA.
HENRY D. TUCKER.

REFERENCES CITED

The following references are of record in the file of this patent:

UNITED STATES PATENTS

| Number | Name | Date |
|---|---|---|
| 13,899 | Amies | Dec. 11, 1855 |
| 2,108,822 | Lippencott | Feb. 22, 1938 |
| 2,180,002 | Ford | Nov. 14, 1939 |
| 2,194,110 | Ballew | Mar. 19, 1940 |
| 2,303,395 | Schultz | Dec. 1, 1942 |
| 2,363,658 | Decker | Nov. 28, 1944 |
| 2,367,423 | Meyers | Jan. 16, 1945 |
| 2,368,085 | Barbieri | Jan. 30, 1945 |
| 2,432,747 | Gilbert | Dec. 16, 1947 |
| 2,433,965 | Upson | Jan. 6, 1948 |